Patented Jan. 6, 1931

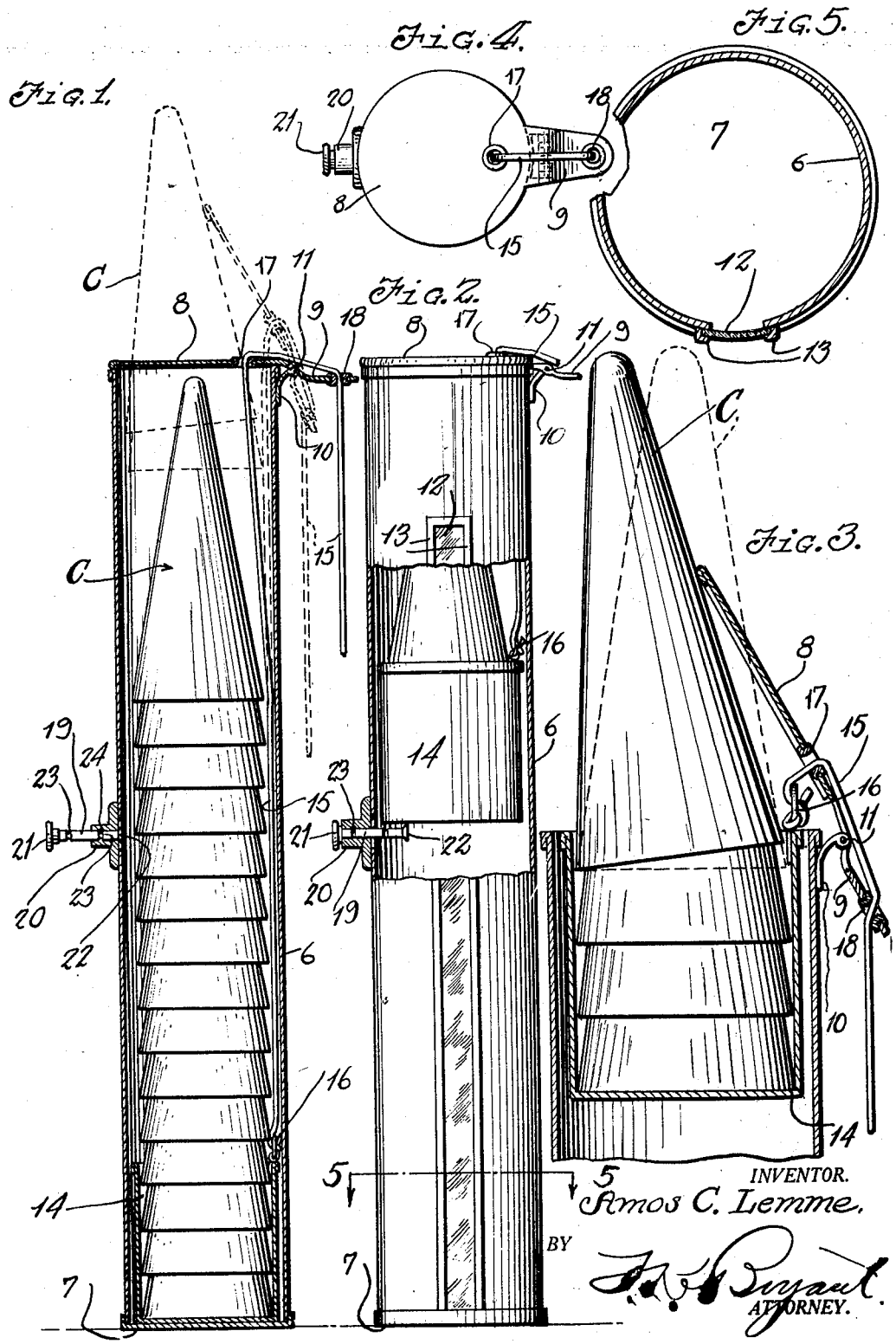

1,788,348

UNITED STATES PATENT OFFICE

AMOS C. LEMME, OF WAUKON, IOWA

DISPENSING APPARATUS

Application filed May 10, 1929. Serial No. 362,003.

This invention relates to certain new and useful improvements in dispensing apparatus and has particular reference to a receptacle or container for ice cream cones constructed for holding the cones in nested arrangement and operable for projecting the cones partially outwardly thereof for easy access in removing the cones from the receptacle.

The primary object of this invention is to provide a dispensing device for ice cream cones wherein a receptacle containing nested cones in inverted formation is provided with a hinged cover that is automatically opened upon partial projection of the nested cones from the receptacle, the cover gravitationally closing and when in open position with the cones partially projected, engaging the top cone to effect initial separation thereof from the next adjacent cone by tilting the same angularly.

A still further object of the invention is to provide a dispensing device for ice cream cone wherein a cup member movably mounted within a cylindrical or tubular casing has the nested ice cream cones carried thereby with means on the casing cooperating with the cup member for holding the same in an elevated position when it is desired to withdraw more than one cone from the receptacle.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a vertical cross-sectional view of the ice cream cone dispensing device constructed in accordance with the present invention, showing the nested cones supported in a vertically shiftable cup member within a tubular casing or receptacle with the cover for the receptacle in closed position, and showing by dotted lines the cover in open position and the nested cones elevated for withdrawal from the receptacle;

Figure 2 is a side elevational view of the dispensing device, partly broken away and shown in section to illustrate the cup member carrying the cones in its elevated supported position;

Figure 3 is an enlarged fragmentary detail sectional view of the upper end of the receptacle with the cup member at the upper end and illustrating the overbalanced hinged cover for the receptacle engaged with the top cone for tilting the same angularly;

Figure 4 is a top plan view of the device; and

Figure 5 is a cross-sectional view taken on line 5—5 of Figure 2, illustrating the transparent panel in the side wall of the receptacle.

Referring more in detail to the accompanying drawing, there in illustrated a dispensing device for ice cream cones designated by the reference character C, the cones being nested and inverted as illustrated. The receptacle 6 is of tubular formation having a bottom wall 7 and a top wall or cover 8 provided with an arm 9 extending from the peripheral edge thereof that is hingedly mounted upon a bracket 10 at the point 11, the arm extending outwardly beyond the bracket and pivot point illustrated. The side wall of the recepticle 6 is provided with a transparent panel 12 retained in position by flanges 13 so that the number of cones C within the receptacle may be determined through the transparent panel.

A cup member 14 is movably mounted within the receptacle 6 and is normally seated upon the bottom wall 7 thereof as shown in Figure 1, the inverted nested cones C being piled in the cup member 14.

Means is provided for automatically opening the hinged cover 8 and simultaneously raising the cup member 14 for elevating the nested cones through the upper end of the receptacle 6 and includes an operating cord 15 attached at one end as at 16 to the upper edge of the cup member 14, the operating cord 15 freely passing through an eyeletted opening 17 provided in the cover 8 adjacent the hinged side 11 thereof and thence downwardly through an eyelet 18 in the outer end of the arm 9.

In operating the dispensing device, the outer hanging end of the operating cord 15 is pulled downwardly, this action first causing the arm 9 to move upon its pivot or hinge 11 to raise the cover 8 to an open or elevated position as shown by dotted lines in Figure 1, a continued pull upon the cord 15 causing the cup member 14 to be elevated and the inverted nested cones C carried thereby to raise above the opened upper end of the receptacle 6 as shown in Figs. 1 and 3. The cover 8 is overbalanced and gravitationally closes upon the open upper end of the receptacle and a slight release on the operating cord 15, after the cones C have been projected as shown in Figs. 1 and 3 will cause the forward edge of the cover 8 to engage the upper cone to slightly tilt the same and disengage the top cone from the adjacent lower one so that the cone to be dispensed is automatically separated from the next cone, should the same partially adhere thereto while nested within the receptacle 6, this operation being indicated by dotted lines in Figs. 1 and 3.

In the event that it is desired to withdraw consecutively a number of cones, one at a time, means is provided for holding the cup member 14 in an elevated position when a pull on the operating cord has been released with a number of nested cones projecting above the receptacle, such means including a horizontally disposed pin 19 slidable through a bearing 20 exteriorly of the receptacle 6 with an operating button 21 upon its outer end and a flanged head 22 upon its inner end to prevent complete withdrawal of the pin through the bearing 20. The pin 19 is provided with a pair of spaced annular grooves 23 to be engaged by a spring finger 24 confined within the bore of the bearing 20 for cooperation with the spaced annular grooves 23 so that the pin 19 is retained in its longitudinally shifted position. The cup member 14 may be elevated above the pin bearing 20 when the latter is withdrawn from the interior of the receptacle 6 as shown in Figure 1 and when the cup member is raised above the pin bearing as shown in Figure 2, the pin is pressed inwardly to be disposed beneath the cup member for holding the same in its raised position and at which time the top cones of the nested group may be consecutively removed.

From the above detailed description of the invention, it is believed that the construction and operation thereof will at once be apparent, and while there is herein shown and described the preferred embodiment of the present invention, it is nevertheless to be understood that minor changes may be made therein without departing from the spirit and scope of the invention as claimed. Such changes include a bracket or stand mounting for the receptacle while the material, from which the receptacle is constructed, may be of glass, isinglass or mica, tin or any preferred material.

I claim:—

1. A dispensing device for ice cream cones comprising a tubular receptacle, a hinged cover therefor, an outwardly directed arm carried by the cover at the hinged side thereof, a cup member in the receptacle for carrying inverted nested ice cream cones, and means for simultaneously opening the cover and raising the cup member, including a pull cord attached to the cup member and threaded through openings in the cover and arm.

2. A dispensing device for ice cream cones comprising a tubular receptacle, a hinged cover therefor, an outwardly directed arm carried by the cover at the hinged side thereof, a cup member in the receptacle for carrying inverted nested ice cream cones, means for simultaneously opening the cover and raising the cup member, including a pull cord attached to the cup member and threaded through openings in the cover and arm, and a slidably mounted pin carried by a wall of the receptacle adapted to be projected into the casing and be disposed beneath the cup member when raised for holding the latter in elevated position.

In testimony whereof I affix my signature.

AMOS C. LEMME.